United States Patent [19]

Malito et al.

[11] Patent Number: 5,183,211
[45] Date of Patent: Feb. 2, 1993

[54] CHEMICAL AIDS FOR WET-GRINDING PHOSPHATE ROCK

[75] Inventors: John T. Malito, Oswego, Ill.; Curtis M. Layman, Baton Rouge, La.

[73] Assignee: Nalco Chemical Company, Naperville, Ill.

[21] Appl. No.: 765,357

[22] Filed: Sep. 25, 1991

[51] Int. Cl.$^5$ ............................................. B02C 23/20
[52] U.S. Cl. ........................................ 241/16; 241/21
[58] Field of Search ................... 241/15, 16, 21, 30; 423/167, 319

[56] References Cited

U.S. PATENT DOCUMENTS

| | | | |
|---|---|---|---|
| 4,044,107 | 8/1977 | Houghtaling | 241/21 X |
| 4,113,184 | 9/1978 | Loughrie | 241/15 |
| 4,374,817 | 2/1983 | Lehman et al. | 241/16 X |
| 4,472,368 | 9/1984 | O'Neill et al. | 241/15 X |
| 4,577,804 | 3/1986 | Astley et al. | 241/16 |
| 4,743,396 | 5/1988 | Fong et al. | . |
| 4,762,894 | 8/1988 | Fong et al. | . |
| 4,795,789 | 1/1989 | Fong | . |
| 4,800,071 | 1/1989 | Kaesler et al. | . |
| 4,997,890 | 3/1991 | Fong et al. | . |

Primary Examiner—Mark Rosenbaum
Assistant Examiner—Frances Chin
Attorney, Agent, or Firm—Robert A. Miller; Joseph B. Barrett

[57] ABSTRACT

A method for reducing the relative viscosity of a phosphate rock slurry during a grinding process in a phosphoric acid production facility is described. The method includes the steps of adding an effective amount of a sulfonated acrylamide or acrylic acid polymer having a molecular weight of from 500 to 100,000 and being selected from the group consisting of sulfonated polymers of acrylic acid/acrylamide copolymers and the copolymerization products of acrylic acid, acrylamide and 2-acrylamido-2-methylpropyl sulfonic acid.

4 Claims, 3 Drawing Sheets

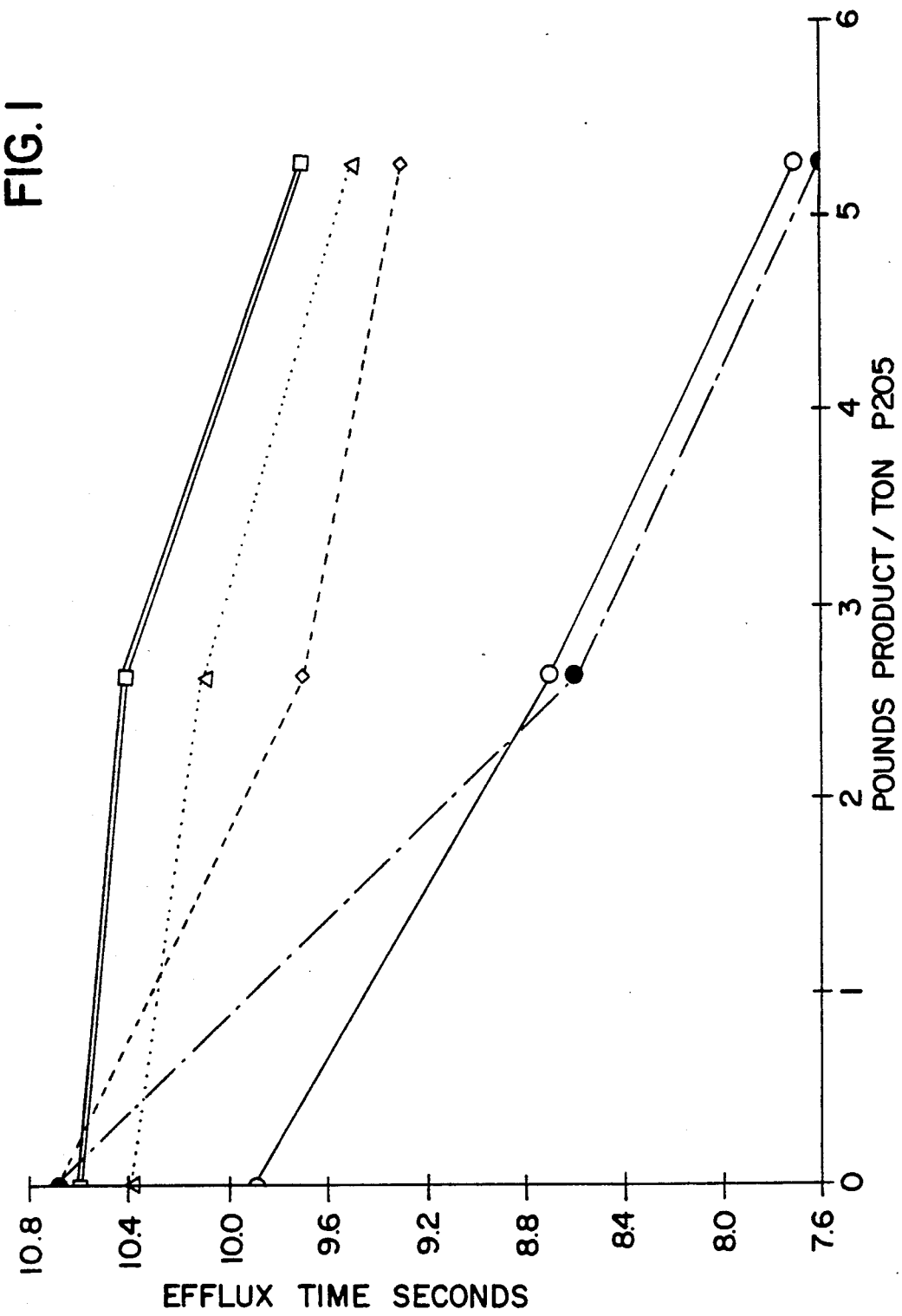

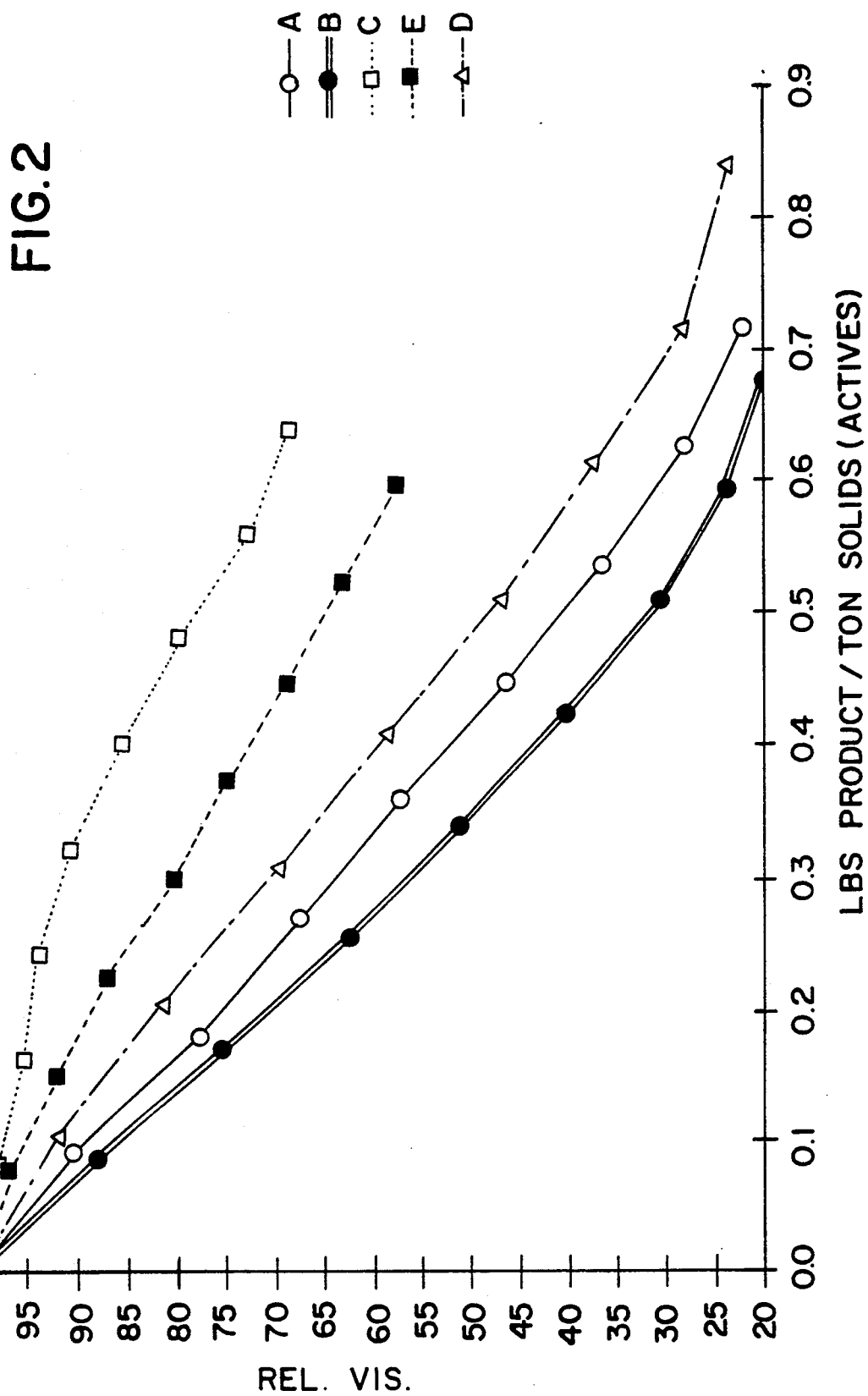

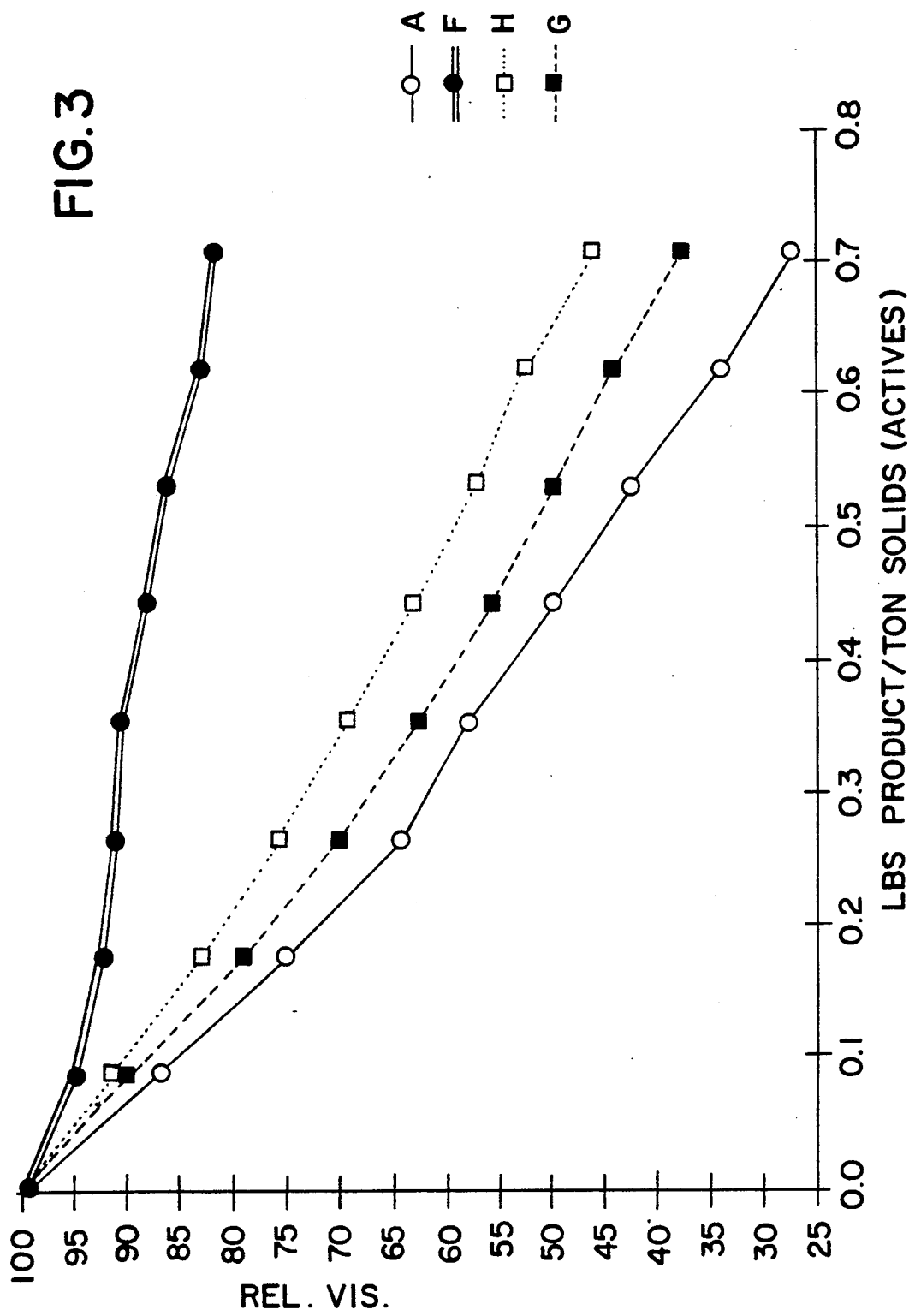

CHEMICAL AIDS FOR WET-GRINDING PHOSPHATE ROCK

BACKGROUND OF THE INVENTION

1. Field of the Invention

The present invention relates generally to the wet process manufacture of phosphoric acid, and more particularly, to chemical aids for wet-grinding phosphate rock.

1. Description of the Prior Art

In the wet process manufacture of phosphoric acid, phosphate-containing ore is mined and slurried in water. The ore is upgraded by washing with water to remove undesirable gangue material which consists mainly of fine clay. This is achieved by the use of cyclones and flotation equipment commonly used in the beneficiation of ores. The washed phosphate rock, sometimes called "pebble phosphate" is then shipped to the phosphoric acid plant for further processing.

The beneficiated phosphate rock received from the mine is, in most cases, too coarse and must be milled to a smaller particle size. Typical particle size distributions for various sources of Florida rock are 8-20%+35 mesh, 59-94%+60 mesh, and 88-95%+100 mesh. The phosphate rock is slurried in water (typically 65-70% solids) and ground in a ball mill to 0.5-3%+35 mesh and 25-60%−200 mesh. The optimum size distribution depends on the particular reactor design used for digestion of the rock, and is chosen to maximize conversion to phosphoric acid.

The ground phosphate rock slurry is combined with recycled phosphoric acid, sulfuric acid, and water in a reactor heated to 165°-190° F., and the mixture is vigorously agitated for 2-8 hours. The phosphate is converted to phosphoric acid and calcium sulfate dihydrate, gypsum, (or in the higher pressure process, hemihydrate) precipitates as a byproduct. The newly-formed gypsum, together with any unreacted phosphate rock, are removed from the crude phosphoric acid by filtration. The filtrate typically contains 25-30% $P_2O_5$ (dihydrate process) or 40% (hemihydrate process) is retained while the washed filter cake is discharged as waste. The acid filtrate is finally concentrated stage-wise in vacuum evaporators to 54% to $P_2O_5$ (100% $H_3PO_4$) or to as high as 72% $P_2O_5$ (super phosphoric acid).

In its present form, wet-grinding of phosphate rock was developed in 1973 and is practiced in almost all U.S. Plants. The advantages of wet-grinding over dry-grinding are:

1. elimination of energy costs for drying rock;
2. elimination of pollution control (mainly phosphate rock dust); and
3. reduction in the size of grinding mills and associated energy consumption.

The major disadvantages of wet-grinding are:

1. it is very difficult to control the amount of oversize rock (even when operated in a closed-loop grinding process), this leads to incomplete extraction of the phosphate value from the ore;
2. reduced $P_2O_5$ strength in the reactor due to dilution with water associated with the slurry, this requires larger evaporators, and higher evaporation costs;
3. reduced volume of water available for washing the gypsum filter cake, resulting in higher water-soluble $P_2O_5$ losses; and
4. overgrinding of soft, porous rock which produces slurries with high viscosity and a rock which is too fine and hyperactive, a hyperactive rock yields very fine gypsum crystals which are difficult to filter.

The use of the appropriate grinding aid alleviates the aforementioned problems associated with the wet-grinding of phosphate rock. This is possible due to the significant reduction in slurry viscosity afforded by the grinding aid which allows:

1. better grinding by reducing the proportion of oversized particles and more efficient operation of cyclones used in the closed-loop arrangement; this results in improved extraction of the phosphate (lower insoluble losses);
2. a higher percent solids in the slurry resulting in less water to evaporate from the phosphoric acid and more water available for washing the filter cake (lower water-soluble $P_2O_5$ losses); and
3. lower residence time in the ball mill without sacrificing percent solids and particle size distribution in the phosphate rock slurry; this translates into higher throughput and lower energy consumption.

The present invention advantageously provides a grinding aid which provides the above-listed benefits. An additional benefit of the invention, not related to grinding, is the ability of the grinding aid to reduce or eliminate foam during digestion of the phosphate rock. Presently, most, if not all, phosphoric acid plants which process uncalcined rock, must use a defoamer to prevent formation of a stable dense, foam. This foam is generated during the release of carbon dioxide, hydrogen fluoride, and silicon tetrafluoride produced by the action of sulfuric acid on carbonate and fluoride compounds present in the phosphate rock. The present invention advantageously also acts as a defoamer.

SUMMARY OF THE INVENTION

One aspect of the invention provides a method for reducing the relative viscosity in a phosphate rock slurry during grinding ore in a phosphoric acid production facility, the method including the step of adding an effective amount of a sulfonated acrylamide or acrylic acid polymer having a molecular weight of from 500 to 100,000 and being selected from the group consisting of sulfonated polymers of acrylic acid/acrylamide copolymers and the copolymerization products of acrylic acid, acrylamide and 2-acrylamido-2-methylpropyl sulfonic acid. According to one preferred embodiment, the effective amount of the sulfonated polymer is from 0.05 to 10.0 lbs. of active polymer per dry ton of phosphate rock. In another preferred embodiment, the effective amount of the sulfonated polymer is from 0.1 to 1.0 lbs. of active polymer per dry ton of phosphate rock. The molecular weight of the sulfonated polymers in a preferred embodiment is further defined as from 1,000 to 10,000.

BRIEF DESCRIPTION OF THE DRAWINGS

FIG. 1 is a graphic representation of the effect of the polymers of the present invention on phosphate rock slurry viscosity as measured by a reduction in efflux time;

FIG. 2 is a graphic representation of the effect of the polymers of the present invention on phosphate rock slurry viscosity as represented by reduction in relative viscosity versus pounds of polymer per ton of dry phosphate rock solids; and FIG. 3 is a graphic representation of the effect of the polymers of the present invention on phosphate rock slurry viscosity represented as a reduction in the relative viscosity of the slurry.

DESCRIPTION OF THE PREFERRED EMBODIMENTS

One aspect of the invention provides a grinding aid including low molecular-weight sulfonate-containing polymers, preferably, sulfo-alkyl amido derivatives of acrylic acid and acrylamide copolymers. It is understood that the term "acrylic acid" includes acrylic acid, and its various salts such as sodium, or potassium, or ammonium, or calcium acrylate and the like. It is understood that the term "sulfonate" includes sulfonic acid and its various salts such as sodium, or potassium, or ammonium or calcium sulfonate and the like.

As described herein, the compositions and methods of the invention are effective not only in dispersing phosphate rock, in aqueous suspension, but also in arresting the formation of foam during the digestion of the phosphate slurry. Other benefits, such as better gypsum crystal formation, enhanced gypsum filtration, improved drainage of liquid from the gypsum filter cake, and reduced scale formation in the digestors, filter pans, and evaporators are believed to be provided by the grinding aids of the invention.

According to one embodiment of the invention, the grinding aid includes sulfonated polymers of acrylic acid/acrylamide copolymers which have been modified by subsequent reaction with formaldehyde and bisulfite. According to another embodiment of the invention, sulfonated polymers are formed by the copolymerization of acrylic acid, acrylamide and 2-acrylamido-2-methylpropyl sulfonic acid. Without limiting the invention, it is believed that the sulfonated polymers act as dispersants, thereby reducing the viscosity of the phosphate rock slurry. The sulfonated polymers of the invention preferably have molecular weights of less than 100,000. More preferably, the molecular weight of the polymer is from 500 to about 50,000, and most preferably, the molecular weight of the polymer is from 500 to about 10,000. The low molecular weights of the polymers allow them to form true aqueous solutions even at concentrations as high as 40 weight %.

The sulfomethylation of the polymers of the invention can be performed on homopolymers of acrylic acid or acrylamide, or on copolymers of acrylic acid and acrylamide. U.S. Pat. No. 4,795,789 describes how homopolymers of molecular weight ranging from as little as 1,000 to as high as several millions can be made to react with ammonia, formaldehyde and bisulfite to produce polymers having from 1 to 60 mole % of the carboxylate converted to acrylamido methyl sulfonic acid groups. That disclosure is incorporated herein by reference. Also, U.S. Pat. No. 4,997,890 teaches that high-molecular-weight homopolymers of acrylamide can be made to react with formaldehyde and sulfite or bisulfite to produce polymers containing 3.5 to 8.7 mole % acrylamido methyl sulfonic acid with RSV in the range 14 to 44.3. That disclosure is incorporated herein by reference. Due to hydrolysis and transamidation reactions, the polymers obtained from either homopolymer are actually terpolymers of acrylic acid, acrylamide and acrylamido methyl sulfonic acid. U.S. Pat. Nos. 4,743,396 and 4,762,894 show how terpolymers are obtained by reaction of formaldehyde and bisulfite with copolymers of acrylic acid and acrylamide, and those portions of these patents are incorporated herein by reference.

The compositions of the sulfonated polymers of the invention containing acrylamido methyl sulfonic acid, made by the reaction of formaldehyde and bisulfite with copolymers of acrylic acid and acrylamide (50:50 mole ratio) at various molecular weights, are shown below and are commercially available from Nalco Chemical Company, Naperville, Ill. These polymers have been demonstrated to be useful in the practice of the invention.

| Polymer | MOLE % ACRYLAMIDO Methyl Sulfonic Acid | MWT |
|---|---|---|
| A | 5 | 6,480 |
| B | 17 | 7,350 |
| C | 10 | 51,400 |
| D | 19 | 17,500 |
| E | 20 | 43,200 |

Another type of preferred sulfonated polymer is made by the copolymerization of acrylic acid and 2-acrylamido-2-methylpropyl sulfonic acid (AMPS). These polymers are commerically available from Nalco Chemical Company. Polymers G and H listed below have been demonstrated to be useful in the practice of the invention. The compositions of these are:

| Polymer | MOLE RATIO OF Acrylic Acid/AMPS | MWT |
|---|---|---|
| F | 0/100 | 5900 |
| G | 90/10 | 5500 |
| H | 30/70 | 9300 |

According to the invention, dispersancy, rather than flocculation, is desired. Therefore, the preferred molecular weight is less than 100,000, and most preferably less than 10,000. Due to the low molecular weight, these polymers form true aqueous solutions at high concentrations. The sulfonated polymers of the invention are preferably added to the phosphate rock slurry in an effective dosage of from 0.05 to about 10.0 lbs. of active polymer per ton of dry phosphate rock. More preferably, the sulfonated polymers are added in an effective dosage range of from 0.1 to 2.0 pounds of polymer per dry ton of phosphate rock, and most preferably, the effective dosage is from 0.2 to 1.0 pound of polymer per dry ton of phosphate rock. The effective dosage of the polymer is that dosage level which reduces the relative viscosity of the phosphate rock slurry by at least 10%. In contrast to the polymers of the invention, high molecular weight polymers, such as the acrylic acid and AMPS copolymers described in U.S. Pat. No. 4,800,071 where molecular weights are at least 500,000 and generally several millions are not within the contemplation of the present invention since these high molecular weight polymers act as flocculants, and would, in fact, increase the relative viscosity of the phosphate rock slurry.

The following examples are presented to describe preferred embodiments and utilities of the invention and are not meant to limit the invention unless otherwise stated in the claims appended hereto.

EXAMPLE 1

A convenient, fast and reproducible method for determining relative viscosity is to measure the time required to drain a fixed volume of phosphate rock slurry through a long-stemmed conical funnel. Using this method, the polymers of the present invention at moderate dose levels were shown to significantly reduce the relative viscosity of a phosphate rock taken from a ball mill. According to the method, phosphate rock slurries were collected from a slurry sludge tank at an operating mine. A long-stemmed funnel was filled with the slurry and the time required to drain the funnel was recorded. The polymer grinding aids were added neat into the slurry and dispersed with manual agitation. The procedure was repeated for several doses of polymers.

Five polymers were evaluated: I; J; K; L; and M. Only polymers I and J are representative of the sulfonated polymers of the present invention. Polymer I is a 50 mole % acrylic acid, 38–45 mole % acrylamide, 5–12 mole % sulfomethyl, molecular weight 5,000–8,000, weight % actives 35. Polymer J is a 50 mole % acrylic acid, 28–33 mole % acrylamide, 17–22 sulfomethyl, molecular weight 14–25,000, weight % actives 37 weight %. Polymer K is a non-sulfonated polymer made from acrylic acid, and methyl acrylate molecular weight approximately 10,000, weight % actives 20 weight %. Polymer L is not a sulfonated polymer and is a copolymer including 82 mole % sodium acrylate and 18 mole % methyl acrylate having a molecular weight of about 10,000 and weight % actives of 32–34 weight %. Polymer M is not a sulfonated polymer and is a copolymer including 21.2 weight % of acrylic acid and 23.6 weight % acrylic acid and ethyl acrylate copolymer. The data collected are summarized in FIG. 1. As shown in FIG. 1, only the sulfonated polymers of the invention reduced relative viscosity as evidenced by a significant reduction is efflux time.

EXAMPLE 2

A rapid, convenient method for estimating relative viscosity of phosphate rock slurries under conditions of high shear stress was utilized. The procedure involved the determination of torque on a 3-bladed paddle rotating at a constant RPM in the phosphate rock slurry. Using this method, the polymers of the present invention at moderate dose levels were shown to significantly reduce the viscosity of the phosphate rock slurry taken from a ball mill. Tests of the present invention, have demonstrated that less than one pound of the polymers of the present invention per ton of dry rock reduced the viscosity in the slurry by more than 50%, thereby reducing production lost in an operating plant significantly.

Eight polymers were evaluated to determine their effect on phosphate rock slurry viscosity. The method used for the example is as follows. A G. K. Heller Stir-tester, model HST 10M equipped with a 3-bladed paddle, No. A260106, was mounted over a stainless steel 2-liter beaker. The bottom of the paddle was positioned 2 centimeters from the bottom of the beaker. The paddles were vertical and perfectly centered in the beaker. Into the beaker was added 1.5 liters of a phosphate rock slurry including 66.30% solids and having a specific gravity of 1.595. Immediately, the slurry was agitated at 650 RPM. A vortex having a depth of around ½ inch was evident. Agitation was sufficient to keep all solids suspended but not vigorous enough to expose the paddle blades. The torque (in grams/cm) on the paddle was read after a one-minute break-in period. After the torque was recorded, selected dosages of the polymers were added to the slurry to mix for at least one minute. As shown in FIGS. 2 and 3, the polymers were added from 0.1–0.8 pounds active polymer per dry ton of phosphate rock solids. After one minute, the torque was determined and recorded. The procedure was repeated for each dosage level and for each polymer. The data collected is summarized in FIGS. 2 and 3. As shown in FIGS. 2 and 3, the relative viscosity was reduced by as much as 80%.

Changes can be made in the composition, operation and arrangement of the method of the present invention described herein without departing from the concept and scope of the invention as defined in the following claims:

We claim:

1. A method for reducing the relative viscosity of a phosphate rock slurry during a grinding process in a phosphoric acid production facility, the method comprising the step of adding during the grinding process an effective amount of a sulfonated polymer having a molecular weight of from 500 to 100,000 and being selected from the group consisting of sulfonated polymers of acrylic acid/acrylamide copolymers and the copolymerization products of acrylic acid, acrylamide and 2-acrylamido-2-methylpropyl sulfonic acid.

2. The method of claim 1 wherein the effective amount of the sulfonated polymer is from 0.05 to 10.0 lbs. of active polymer per dry ton of phosphate rock.

3. The method of claim 2 wherein the effective amount of the sulfonated polymer is from 0.1 to 1.0 lbs. of active polymer per dry ton of phosphate rock.

4. The method of claim 1 wherein the molecular weight of the sulfonated polymers is further defined as from 1,000 to 10,000.

* * * * *